Patented Sept. 23, 1947

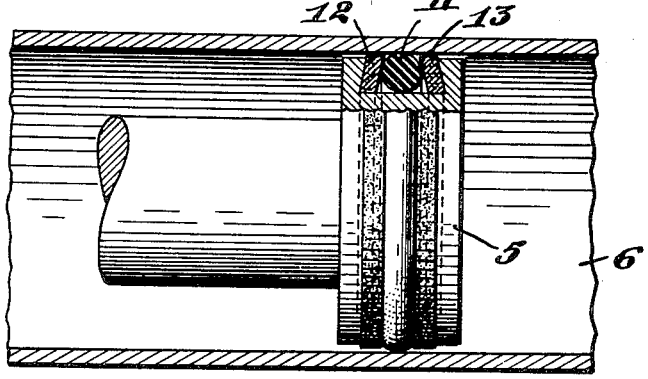
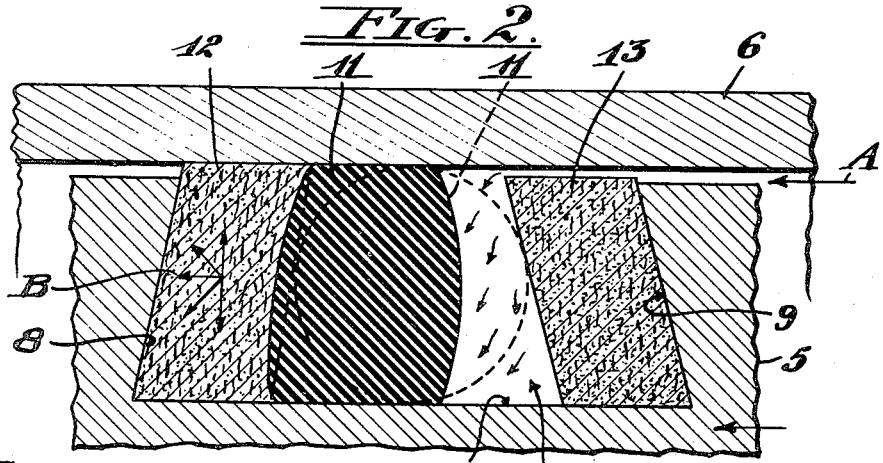
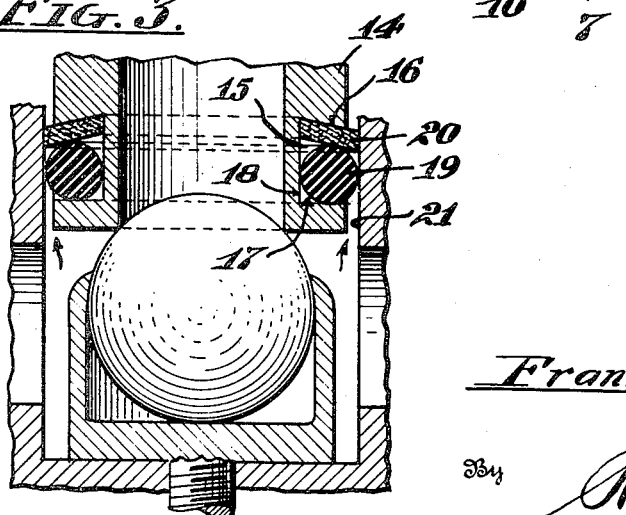

2,427,787

UNITED STATES PATENT OFFICE 2,427,787

SEAL FOR PISTONS AND THE LIKE

Frank B. Hunter, La Canada, Calif., assignor to Adel Precision Products Corp., a corporation of California Application August 31, 1944, Serial No. 552,082

6 Claims. (Cl. 309—23)

1

This invention relates to a sealing or packing means for pistons and like members especially the piston-like components of high pressure hydraulic systems as used in aircraft.

The primary object of this invention is to provide a sealing or packing means which will effect and maintain over long periods of time and under extremely high pressures as well as under extremely high and low temperatures, a reliable leak-proof seal for a piston-like member without imposing an objectionable friction load on and impairing the operation of the piston-like member or causing undue wear of the elements of the seal and frequent replacement thereof.

Another object of this invention is to provide a sealing means of the character described which is readily and advantageously applicable to relief valves in high pressure hydraulic systems and to poppet and other valves for such systems as well as to pistons and piston-like valves, shuttle valves and the like, to increase the efficiency and assure a reliable operation thereof without lag or sluggish response which sometimes occurs as a result of excessive friction load caused by sealing means as heretofore used.

It should be noted that where a sealing ring of elastic rubber or like material is used, as is highly desirable, as a part of a seal of the type to which the present invention relates, it must be comparatively soft in order to function properly at extremely low temperatures, and when such a ring is subjected to high pressures it will extrude or "flow" between the piston-like member and the wall of the bore or cylinder in which said member operates and thus become damaged or worn to the extent that the sealing action thereof is impaired. The present invention contemplates the use of this type of rubber sealing ring together with means which will prevent such extrusion of "ffow" and consequent wear and damage as hereinabove stated and assure a reliable seal under high and low temperatures as well as under extremely high pressures.

A further object of my invention is to provide composite sealing means such as described which includes coacting compressible and annular sealing members of a particular construction seated in a common groove of a piston-like member which groove is of a particular cross section in order to coact with the sealing members so that they will be compressed and the material thereof caused to "flow" or be displaced into effecting sealing contact with walls of the groove and the wall of the bore or cylinder in which the piston-like member is operated, without being bodily displaced to such an extent as would set up an objectionable friction load on the piston-like member and possibly impair its operation as well as cause undue wear of the sealing members.

A further object is to provide a composite seal-

2 ing assembly adapted to be mounted in a groove of a piston-like member and which includes a sealing ring of soft elastic rubber or like material and a compressible gasket of leather or the like constructed and arranged so that under high fluid pressures the ring and gasket will be compressed and coact so as to have a controlled sealing contact with one another, with walls of the groove and the wall of the bore or cylinder for the piston-like member, the gasket having the additional function of restricting and controlling the displacement or "flow" of the soft material to the ring to confine it to the groove and prevent damage of the ring as well as being itself controlled as to displacement of its material by means of said ring in coaction with the side wall of the groove against which the gasket abuts.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a sectional view of a piston and cylinder assembly showing the piston equipped with a seal embodying my invention.

Fig. 2 is an enlarged fragmentary sectional view showing the action of the sealing means when under pressure and in sealing position.

Fig. 3 is a fragmentary vertical sectional view partly in elevation of a relief valve member wherein the valve member is equipped with a modified form of sealing means embodying my invention.

Referring more specifically to the drawings it is seen that my invention as shown in Figs. 1 and 2 is embodied in a piston 5 reciprocably mounted in a cylinder 6 and subjected to fluid pressure at opposite ends.

In accordance with my invention a seal-receiving groove 7 is formed in the piston in the usual manner except that the side walls 8 and 9 of the groove converge from the bottom wall 10 toward the open side of the groove. The composite compressible seal of my invention is mounted in the groove 7 and is constructed and arranged so that in coaction with the converging side walls 8 and 9 the material of the seal is caused to "flow" or be displaced into effective sealing contact with the walls of the cylinder and groove without causing a bodily outward movement of the seal toward the cylinder wall. This arrangement also prevents the material of the seal when under high pressures from "flowing" between the piston and the cylinder and becoming readily abraded, worn and damaged.

As shown in Figs. 1 and 2 one form of composite sealing means embodying my invention includes a soft rubber or soft synthetic rubber ring 11 of substantially circular cross section mounted in the groove 7 between annular gaskets 12 and 13 of leather or like compressible material, which gaskets are of substantially rectangular cross section, relatively thick and lie against the converging side walls 8 and 9. The arrangement is such that the sealing ring and sealing gaskets normally appear as in Fig. 1 and in the right half of Fig. 2, with the inner peripheries of the gaskets substantially abutting the bottom wall 10 of the groove and the outer peripheries of the gaskets disposed for contact with the cylinder 6. The inner and outer peripheries of the sealing ring 11 are normally in sealing contact with the bottom wall 10 of the groove and cylinder 6.

With reference to Fig. 2 it is seen that the ring normally contacts the bottom 10 of the groove 7 as well as the opposed faces of the gaskets 12 and 13. The gasket 13 is shown in its normal position but with an exaggerated clearance from the wall of the cylinder, to indicate how the pressure of fluid from the ends of the piston will gain access to and act upon the ring and gaskets.

Assuming that high pressure fluid is effective against gasket 13 from the direction indicated by the arrow A, this being from the right end of the cylinder as shown in Figs. 1 and 2, then the behavior or action of the ring 11 and gasket 12 is as indicated by the full line showing thereof in Fig. 2. Under high pressure applied as next above stated the soft rubber ring 11 "flattens" out against the inner face of the gasket and against the bottom 10 of the groove and the wall of the cylinder respectively. Due to the ring having a circular cross section and therefore presenting less material nearer to the bottom of the groove and nearer to the entrance of the groove, and having its greatest diameter extended midway of the bottom wall and the entrance of the groove, said ring under such pressure will take a convex formation on the surfaces thereof opposed to the two gaskets. Consequently the compressible gasket 12 is depressed and formed with a concavity between its inner and outer peripheries and forces are applied thereto by the ring 11 in the directions indicated by the arrows B in Fig. 2. These forces tend to move the gasket bodily but inasmuch as the side wall 8 converges toward the open side of the groove 7, said forces cause the material of the gasket to be displaced without bodily movement, whereby the inner and outer peripheries thereof are forced into "controlled" sealing contact with the bottom wall 10 and the wall of the cylinder 6 respectively, while the outer face of the gasket is forced into sealing contact with the side wall 8. At the same time the convex surface of the ring 7 seats on and seals the entire inner face of the gasket 12 and due to this convex surface fitting closely into the then concaved surface of the gasket there is provided a coaction between the gasket and ring to control the displacement of the ring, and gasket as well, axially of the groove. This results in an effective sealing contact of the gasket 12 and ring 11 against the wall of the cylinder without imposing a high friction load on the piston.

When the initial pressure is applied to the gasket 12 by the ring 11 under the high fluid pressure as aforesaid, the material of the gasket is displaced into contact with the wall of the cylinder before the material of the ring between the center of the ring and the wall of the cylinder will have been compressed and extruded to the corner space where the inner edge of the outer periphery of the ring contacts the cylinder wall, thereby preventing "flow" or extrusion of the ring 11 between the outer periphery of the gasket 6 and the cylinder wall, in other words positively confining the ring 11 to the groove 7 proper while permitting the aforesaid controlled sealing contact of the ring with the cylinder wall as clearly indicated in Fig. 2. Thus it is seen that the gasket 12 acts both as a sealing medium and as an extrusion preventing guard for the soft sealing ring 11, which latter as hereinbefore stated becomes almost fluid under extremely high pressures but must of necessity be comparatively soft in order to function properly at extremely low temperatures.

When pressure is applied from the opposite direction (from the left end of the piston as shown in Figs. 1 and 2) the gasket 12 allows the pressure to be effective against ring 11 and gasket 13 which then operate in the same manner as when pressure is applied from the left end of the cylinder.

A modified form of the invention shown in Fig. 3, is applied to a piston-like relief valve such as forms the subject matter of my pending applications Ser. No. 525,270 and 525,271 both filed on March 6, 1944. In this arrangement, as the pressure is applied against the valve 14 in one direction only, it is provided with a groove 15 having only one side wall 16 converging toward the open side of the groove, the other side wall 17 being at right angles to the bottom wall 18 of the groove. In this arrangement a single rubber sealing ring 19 of circular cross section and one flat leather or similar gasket are employed, the gasket being interposed between the ring and the convergent side wall 16 of the groove. Under high pressure the rubber ring "flows" and is compressed against the bottom of the groove, the gasket 20 and the wall 21 of the bore in which the valve is mounted thereby causing the material of the gasket to flow radially without causing any bodily movement of the gasket such as would set up too great a friction load on the valve. Moreover the gasket 20 prevents such "flow" of the rubber ring between the valve and the bore wall 21 as would cause abrasion and damaging wear of the sealing ring. It will be apparent that in this use of the invention it operates as a static seal so long as the pressure does not exceed the limit at which the valve opens, and that, therefore, its usefulness is not limited to a seal between parts having relative movement.

It is now apparent that with a soft rubber or soft synthetic rubber ring mounted in a ring groove, which latter has a side wall or both side walls converging toward the entrance of the groove, in combination with sealing gaskets, as shown in Figs. 1 and 2 or a single gasket as shown in Fig. 3, there is provided a most efficient high pressure seal for a piston-like member, and which will have a comparatively long life under extremely high pressures as well as under extremely low and extremely high temperatures. This provision for effective sealing under extreme temperatures and pressures is particularly important in high pressure hydraulic systems for aircraft which are subjected to extreme changes in temperature in flying into and out of the sub-stratosphere.

While I have shown and described a specific embodiment of my invention I do not limit myself to the exact details of construction set forth, and the invention embraces such changes, modifications and equivalents of the parts and their for-

I claim:

1. In a sealing means, a piston-like member adapted to have a working fit in a cylinder or bore and having a circumferential seal-receiving groove therein, a compressible elastic sealing ring of substantially circular cross section mounted in said groove, and a compressible annular gasket of substantially rectangular cross section mounted in said groove so that its inner periphery contacts the bottom of the groove, its outer periphery is disposed to contact the wall of the bore or cylinder in which the piston-like member is operable, one face thereof contacts one side wall of the groove and the other face thereof contacts the sealing ring, said one side wall being converged toward the entrance of the groove to resist bodily movement of the gasket axially of the groove.

2. A piston-like member adapted for a working fit in a bore or cylinder and having a circumferential seal-receiving groove a side wall of which converges toward the entrance of the groove, a compressible elastic sealing ring mounted in said groove and being of substantially circular cross section, and an annular compressible gasket mounted in said groove so as to seat against said converging side wall with its inner periphery in contact with the bottom of the groove and its outer periphery extended from said groove for contact with the wall of the bore or cylinder in which said piston-like member is operable.

3. A piston-like member adapted to have a working fit in a bore or cylinder and having a circumferential seal-receiving groove a side wall of which converges toward the entrance of the groove, a compressible elastic sealing ring of substantially the same cross-sectional diameter in directions both axially and transversely of the groove with the inner and outer peripheries thereof adapted to engage the bottom of the groove and the wall of the bore or cylinder respectively, and an annular compressible gasket mounted in said groove so as to seat against said converging side wall on one face and against said ring on its other face, with its inner periphery disposed to contact the bottom of the groove and its outer periphery disposed to contact the wall of said bore or cylinder.

4. A piston-like member adapted to have a working fit in a bore or cylinder and having a circumferential seal-receiving groove the side walls of which converge toward the entrance of the groove, a compressible elastic sealing ring mounted in the groove and being of substantially the same cross-sectional diameter in directions both axially and transversely of the groove with its inner and outer peripheries adapted to contact the bottom of the groove and the wall of the bore or cylinder, respectively, and annular compressible gaskets interposed between said side walls and said sealing ring with their inner peripheries disposed to contact the bottom of the groove and their outer peripheries disposed to contact said wall of said bore or cylinder, said gaskets acting to prevent flow of the material of said ring between the piston-like member and said wall of said bore or cylinder, said converging side walls of the groove acting to restrict the bodily movement of said gaskets axially of said groove, said sealing ring being subject to compression by pressure of fluid directed in either direction against the piston-like member and operating when compressed to compress one of said gaskets to displace the material thereof into sealing contact with walls of said groove and said wall of said bore or cylinder.

5. In a sealing means, a member adapted to have a working fit in a bore or cylinder which is subjected to a high fluid pressure, said member having a seal-receiving groove therein, a sealing ring of soft elastic material mounted in said groove with its inner and outer peripheries in contact with the bottom of the groove and the wall of said bore or cylinder respectively, and an annular gasket of substantially rectangular cross section formed of leather or like compressible material mounted in said groove between a side wall of the groove and said ring with the ring normally contacting the inner face of the gasket between the inner and outer peripheries of the latter, said gasket and ring being constructed and arranged so that when fluid pressure is applied to said ring in a direction toward the gasket, the ring will be distorted and compressed so as to sealingly engage the wall of the bore or cylinder and the bottom of said groove while the portion of the ring opposed to the gasket is forced into sealing contact therewith and depresses and forms a concavity in said gasket so that the material of the gasket is displaced into sealing contact with the bottom of the groove and said wall of the cylinder or bore respectively, the portion of the ring in contact with the groove being convex when the ring is subject to said fluid pressure, said side wall being converged toward the open side of the groove to resist bodily displacement of said gasket axially of the groove.

6. In a pressure responsive hydraulic seal construction comprising a pair of circular members disposed with a working fit one within the other, a circumferential groove in one of said members; said groove having a side face so inclined to the surface of said member that the open side of said groove is of less width than the bottom, a compressible annular gasket disposed in said groove adjacent said inclined face; said gasket having opposed side faces parallel to the inclined face of said groove and having an edge face adjacent the other member disposed parallel to and in engagement with the face of said other member, and a sealing ring of resilient material disposed in said groove on the side of said gasket remote from said inclined face, said sealing ring being of such dimension as to contact both the bottom of said groove and the face of said other member.

FRANK B. HUNTER.

REFERENCES CITED

The following references are of record in the file of this patent:

UNITED STATES PATENTS

| Number | Name | Date |
| --- | --- | --- |
| 2,349,170 | Jackman | May 16, 1944 |
| 2,232,293 | Toennies | Feb. 18, 1941 |
| 2,180,795 | Christensen | Nov. 21, 1939 |
| 1,612,038 | Miller | Dec. 28, 1926 |
| 2,188,957 | Pfauser | Feb. 6, 1940 |
| 2,306,800 | Caldwell | Dec. 29, 1942 |
| 2,042,078 | Suhm | May 26, 1936 |
| 1,482,141 | Parks | Jan. 29, 1924 |
| 2,081,040 | King | May 18, 1937 |